US012252268B2

United States Patent
Tatton

(10) Patent No.: US 12,252,268 B2
(45) Date of Patent: Mar. 18, 2025

(54) ARTIFICIAL INTELLIGENCE TECHNIQUES FOR AUTONOMOUS OPERATION OF PASSENGER BOARDING BRIDGES

(71) Applicant: Oshkosh AeroTech, LLC, Oshkosh, WI (US)

(72) Inventor: Stephen C. Tatton, Spring, TX (US)

(73) Assignee: Oshkosh AeroTech, LLC, Oshkosh, WI (US)

( * ) Notice: Subject to any disclaimer, the term of this patent is extended or adjusted under 35 U.S.C. 154(b) by 0 days.

(21) Appl. No.: 18/908,453

(22) Filed: Oct. 7, 2024

(65) Prior Publication Data

US 2025/0026491 A1 Jan. 23, 2025

Related U.S. Application Data

(63) Continuation of application No. PCT/US2023/022018, filed on May 12, 2023.
(Continued)

(51) Int. Cl.
*B64F 1/305* (2006.01)

(52) U.S. Cl.
CPC ................... *B64F 1/3055* (2013.01)

(58) Field of Classification Search
CPC . B64F 1/305; B64F 1/36; G01C 21/20; G06T 2207/10016; G06T 2207/10048;
(Continued)

(56) References Cited

U.S. PATENT DOCUMENTS

2003/0120358 A1 6/2003 Hutton
2005/0198750 A1* 9/2005 Spencer ............... B64F 1/3055
14/71.5
(Continued)

FOREIGN PATENT DOCUMENTS

CN 112265648 1/2021
CN 118897294 A * 11/2024 ............. G01S 17/10
(Continued)

OTHER PUBLICATIONS

International Search Report and Written Opinion regarding Appl. No. PCT/US2023/022018, mail date Aug. 23, 2023, 23 pps.

*Primary Examiner* — Donald J Wallace
*Assistant Examiner* — Jalal C Coduroglu
(74) *Attorney, Agent, or Firm* — Foley & Lardner LLP

(57) ABSTRACT

In some embodiments, a computer-implemented method of controlling autonomous movement of a mobile object in an aircraft operating area is provided. An autonomous control computing system receives an image from a digital camera positioned to view at least a portion of the mobile object. The autonomous control computing system provides the image to a machine learning model to detect within the image one or more self objects and one or more intruder objects. The one or more self objects are affixed to the mobile object. The autonomous control computing system predicts future locations for the self objects based on a navigation path for the mobile object. In response to detecting an overlap between the future locations for the self objects and the intruder objects, the autonomous control computing system alters the navigation path to prevent a collision between the self objects and the intruder objects.

16 Claims, 11 Drawing Sheets

Related U.S. Application Data

(60) Provisional application No. 63/341,755, filed on May 13, 2022.

(58) Field of Classification Search
CPC . G06T 2207/20081; G06T 2207/20084; G06T 7/70; G06V 10/774; G06V 20/54; G08G 5/045; G08G 5/0026; G08G 5/0082; G08G 5/065
See application file for complete search history.

(56) References Cited

U.S. PATENT DOCUMENTS

| | | | |
|---|---|---|---|
| 2018/0074473 | A1 | 3/2018 | Truscott |
| 2020/0387162 | A1* | 12/2020 | Kobayashi ............. G05D 1/027 |

FOREIGN PATENT DOCUMENTS

| | | |
|---|---|---|
| EP | 1 230 620 | 11/2012 |
| EP | 3 985 561 | 4/2022 |
| WO | WO-2019/141850 | 7/2019 |

* cited by examiner

ARTIFICIAL INTELLIGENCE TECHNIQUES FOR AUTONOMOUS OPERATION OF PASSENGER BOARDING BRIDGES

CROSS-REFERENCE TO RELATED APPLICATION

This application is a continuation of International Patent Application No. PCT/US2023/022018, filed May 12, 2023, which claims priority to U.S. Provisional Patent Application No. 63/341,755, filed on May 13, 2022, both of which are incorporated herein by reference in their entireties.

BACKGROUND

Activities in aircraft operating areas (including, but not limited to, boarding gate areas for aircraft) are highly complex and highly choreographed. The presence and configuration of multiple apparatuses must be coordinated in order to successfully, efficiently, and safely execute the boarding and flight preparation process.

Previously, an operator located at the aircraft operating area would manually drive a passenger boarding bridge into a location to be docked to an aircraft. Recent efforts have attempted to automate portions of the flight preparation process, including but not limited to maneuvering the passenger boarding bridge into position to dock with an aircraft. However, due to the complex environment in aircraft operating areas and the non-standard design of many passenger boarding bridges, many difficulties have arisen.

What is needed are improved techniques for automated understanding of the environment of aircraft operating areas in order enable autonomous operation of equipment devices including (but not limited to) passenger boarding bridges.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of controlling autonomous movement of a mobile object in an aircraft operating area is provided. An autonomous control computing system receives an image from a digital camera positioned to view at least a portion of the mobile object. The autonomous control computing system provides the image to a machine learning model to detect within the image one or more self objects and one or more intruder objects. The one or more self objects are affixed to the mobile object. The autonomous control computing system predicts future locations for the self objects based on a navigation path for the mobile object. In response to detecting an overlap between the future locations for the self objects and the intruder objects, the autonomous control computing system alters the navigation path to prevent a collision between the self objects and the intruder objects.

In some embodiments, a computer-implemented method of automatically determining a distance to an object in a two-dimensional image is provided. A computing device receives at least one image captured by a digital camera. The computing device detects the object in the at least one image. An identifier of the object and a component of the object are visible in the at least one image. The computing device retrieves a dimension of the component of the object based on the identifier. The computing device calculates the distance between the component of the object and the camera based on the dimension of the object and a size of the object in the at least one image.

In some embodiments, a computer-readable medium is provided. The computer-readable medium has instructions stored thereon that, in response to execution by one or more processors of a computing system, cause the computing system to perform a method as described above.

In some embodiments, a system is provided. The system comprises a passenger boarding bridge in an aircraft operating area; at least one camera positioned to capture images of the aircraft operating area; and an autonomous control computing system as described above.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, systems and methods are provided that allow improved autonomous management of aircraft operating areas. An autonomous control computing system may use one or more edge computing devices located at or near aircraft operating areas (e.g., aircraft boarding gates) that are communicatively coupled to one or more cameras positioned to view the aircraft operating areas. The edge computing devices use machine learning models to detect apparatuses (e.g., aircraft, passenger boarding bridges and components thereof, ground service vehicles, etc.) visible in the aircraft operating areas, and may provide an improved ability to autonomously navigate within the aircraft operating areas without causing collisions.

Figure 1:
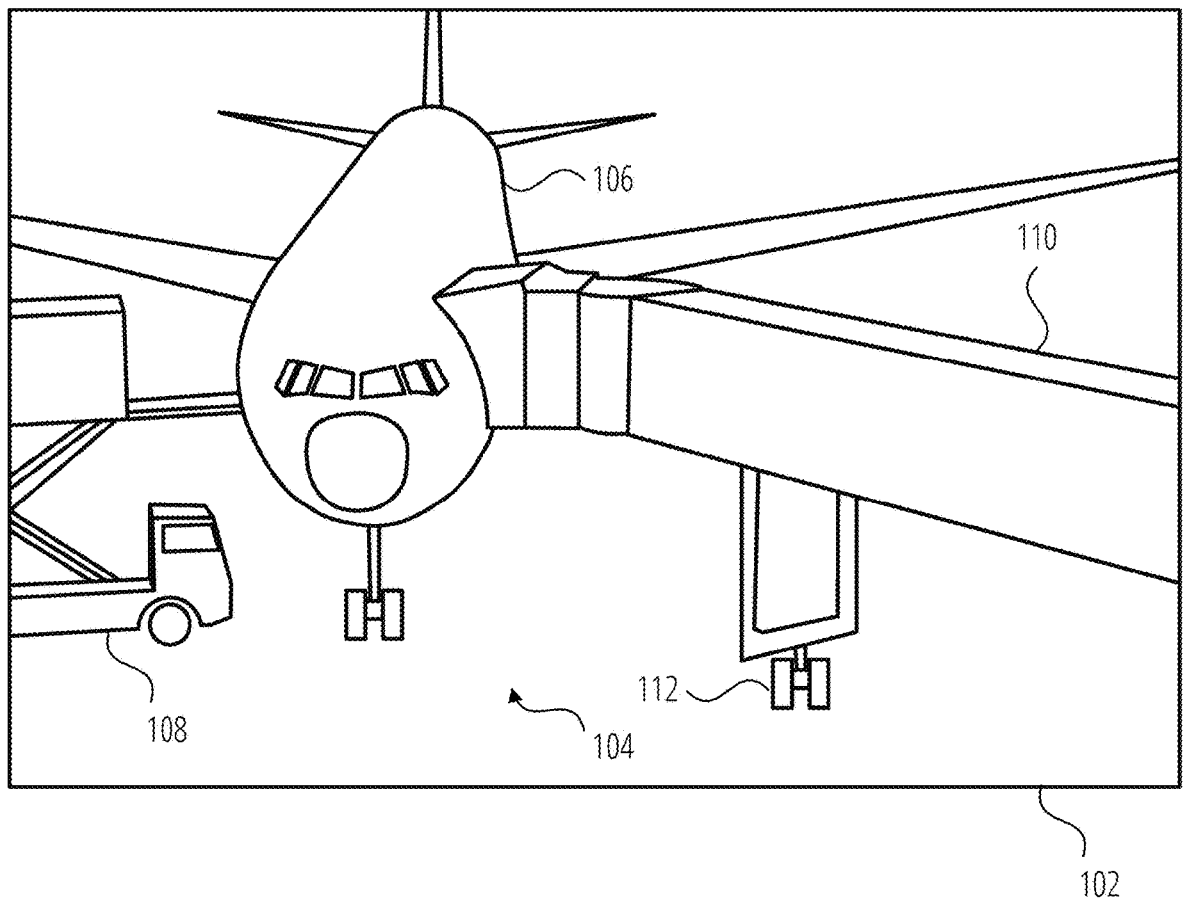
FIG. 1 is an illustration of a non-limiting example of an image of an aircraft operating area according to various aspects of the present disclosure.

FIG. 1 is an illustration of a non-limiting example of an image of an aircraft operating area according to various aspects of the present disclosure. The image 102 is an example of an image that may be captured by a digital camera mounted, for example, on a terminal building. The image 102 shows an aircraft operating area 104, which is an area in which an aircraft 106 is parked in order to board/deboard passengers; load with fuel, galley supplies, baggage, and other items; deice; inspect; and perform various other activities to prepare the aircraft 106 for travel. The image 102 shows the passenger boarding bridge 110 has been deployed and is docked to the aircraft 106 to board/deboard passengers and/or crew. The image 102 also shows that a ground service vehicle 108 has approached the aircraft 106 and is docked to another door of the aircraft 106 to deliver galley supplies. The image 102 also shows that the passenger boarding bridge 110 is driven using a bogie 112, which includes steerable wheels that move the passenger boarding bridge 110 forward, backward, and laterally in order to dock to and separate from various different models of aircraft 106 of different sizes and shapes.

Though various items of equipment are illustrated in the image 102, one will recognize that other types of ground service vehicles 108 or other equipment may be present in the aircraft operating area 104, including but not limited to dollies, chocks, jack lifts, service stairs, baggage carts, fuel trucks, ground power units, belt loaders, tugs, fuel lines, external HVAC carts, de-icing equipment, bomb hoists, and other types of civilian and/or military equipment. Other objects may also be present in the aircraft operating area 104, including but not limited to ground crew members.

Figure 2:
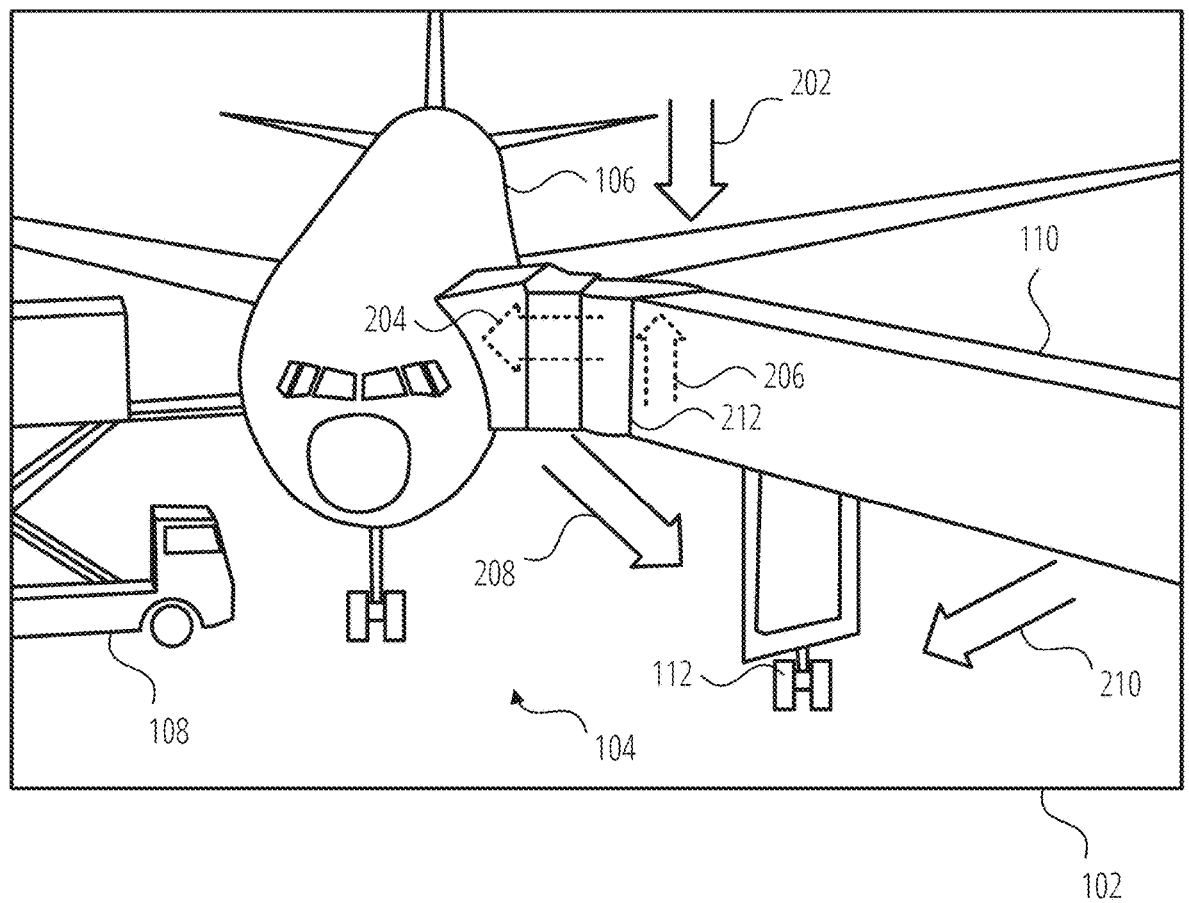
FIG. 2 illustrates non-limiting examples of viewpoints that may be provided by a plurality of cameras in some embodiments of the present disclosure.

In some embodiments of the present disclosure, various digital cameras are installed in and around the aircraft operating area 104 in order to support autonomous operation of the passenger boarding bridge 110. Since the aircraft operating area 104 is a complex environment, multiple cameras may be installed in different positions in order to support specific autonomous functionality. FIG. 2 illustrates non-limiting examples of viewpoints that may be provided by a plurality of cameras in some embodiments of the present disclosure.

As a first example, a top-down access structure view 202 may be provided by a camera mounted on a pole, mounted to a top edge of a rotunda 212 of the passenger boarding bridge 110, or in another manner and aimed substantially vertically (e.g., within 10 degrees of exactly vertical) in order to have a substantially top-down view of an access structure attached to the outside of the passenger boarding bridge 110. Imagery captured of the top-down access structure view 202 can help avoid collisions between the access structure and objects within the aircraft operating area 104 when autonomously manipulating the passenger boarding bridge 110.

Figure 3:
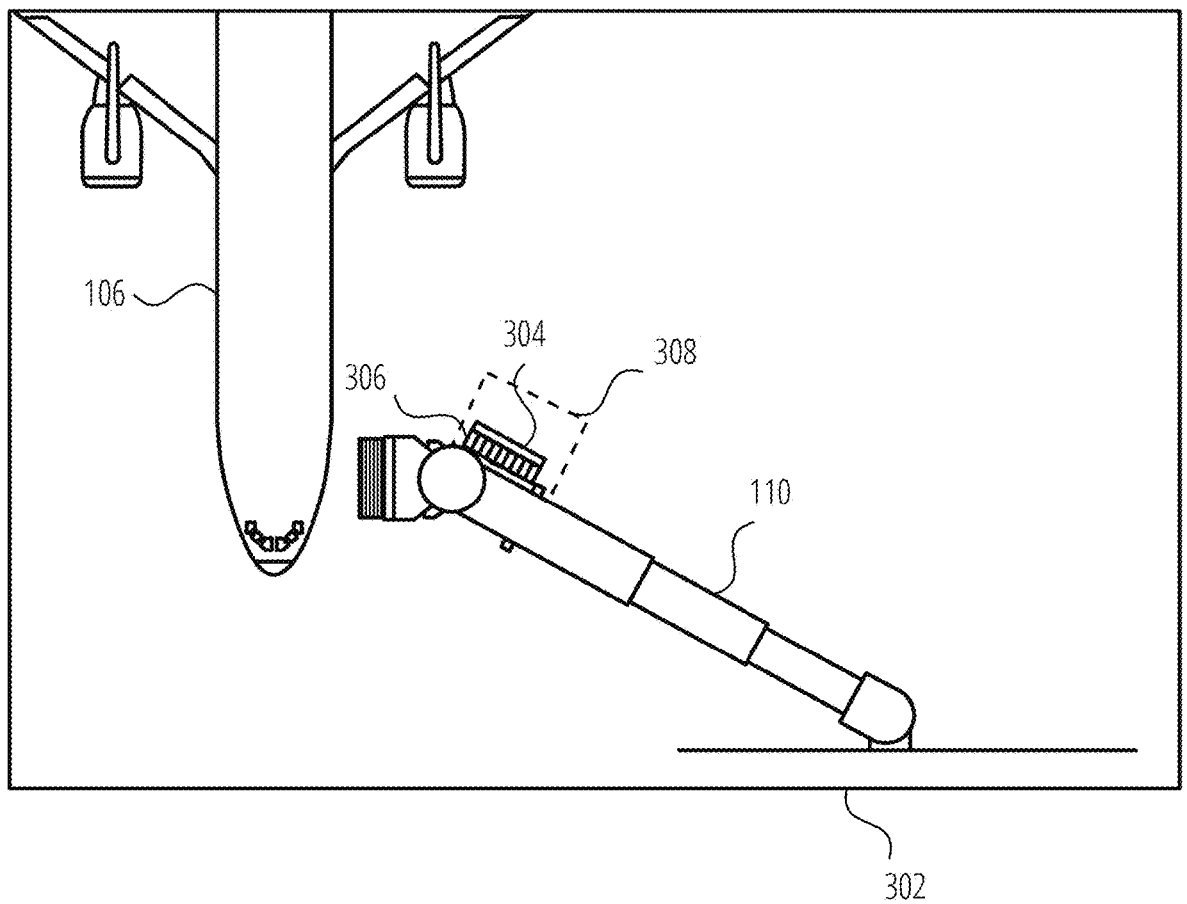
FIG. 3 is a non-limiting example embodiment of an image captured from the top-down access structure view 202 according to various aspects of the present disclosure.

FIG. 3 is a non-limiting example embodiment of an image captured from the top-down access structure view 202 according to various aspects of the present disclosure. In the top-down exterior access image 302, an access structure is shown attached to the rotunda 212 of the passenger boarding bridge 110. The access structure includes a stairway 306 and a bag slide 304, and allows movement of ground crew and baggage between the passenger boarding bridge 110 and the aircraft operating area 104. In some embodiments, other components may be a part of the access structure, including but not limited to a wheelchair lift, a conveyor, or any other type of structure. The top-down exterior access image 302 shows a view from a great height in order to provide context. In an actual embodiment, the field of view of the top-down exterior access image 302 would likely be limited to a smaller area, such as the realistic field of view 308 indicated in the dashed box.

Returning to FIG. 2, a second example of a viewpoint is an interior bridge camera view 204 that may be provided by a camera mounted inside the passenger boarding bridge 110 and pointed toward the distal opening of the passenger boarding bridge 110. Imagery captured of the interior bridge camera view 204 can help detect a status of components of the aircraft 106, and to measure distances between components of the passenger boarding bridge 110 and components of the aircraft 106.

Figure 4:
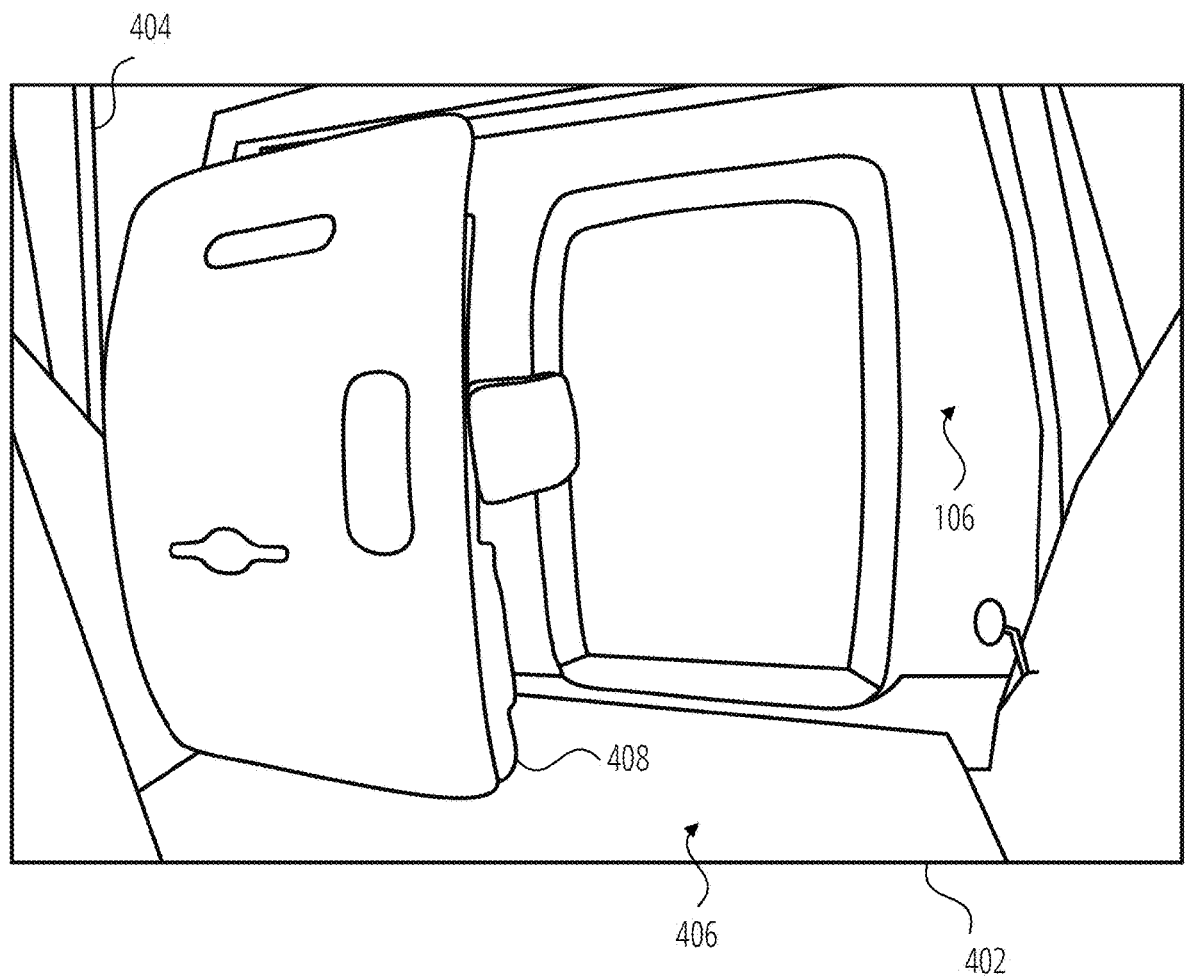
FIG. 4 is a non-limiting example embodiment of an image captured from the interior bridge camera view 204 according to various aspects of the present disclosure.

FIG. 4 is a non-limiting example embodiment of an image captured from the interior bridge camera view 204 according to various aspects of the present disclosure. In the interior bridge image 402, the aircraft 106 is visible outside of the opening of the passenger boarding bridge 110. A bridge cowling 404 has been extended to dock with the aircraft 106, and a bridge floor 406 is visible in the bottom part of the interior bridge image 402. As shown, the aircraft door 408 has been opened and is extended over the bridge floor 406.

Traditionally, a physical sensor known as a safety shoe is installed between the aircraft door 408 and the bridge floor 406 to detect situations where the aircraft door 408 may come close to resting on the bridge floor 406. When the safety shoe detects an unsafe situation, the passenger boarding bridge 110 can be lowered in order to avoid the aircraft door 408 striking the bridge floor 406. With the interior bridge image 402, some embodiments of the present disclosure may automatically determine the distance between the aircraft door 408 and the bridge floor 406 from the imagery. This allows the functionality previously provided by the safety shoe to be replaced by analysis of the interior bridge image 402. This is beneficial because it does not require installation of the physical device under the aircraft door 408, and so can be managed without having an operator present at the passenger boarding bridge 110.

Returning to FIG. 2, a third example of a viewpoint is an exterior bridge camera view 206 that may be provided by a camera mounted to an exterior of the passenger boarding bridge 110 and aimed substantially horizontally (e.g., within 10 degrees of exactly horizontal). Imagery captured from the exterior bridge camera view 206 can be used to measure distances between the passenger boarding bridge 110 and obstructions in the aircraft operating area 104, and can help avoid collisions between the passenger boarding bridge 110 and such obstructions.

Figure 5:
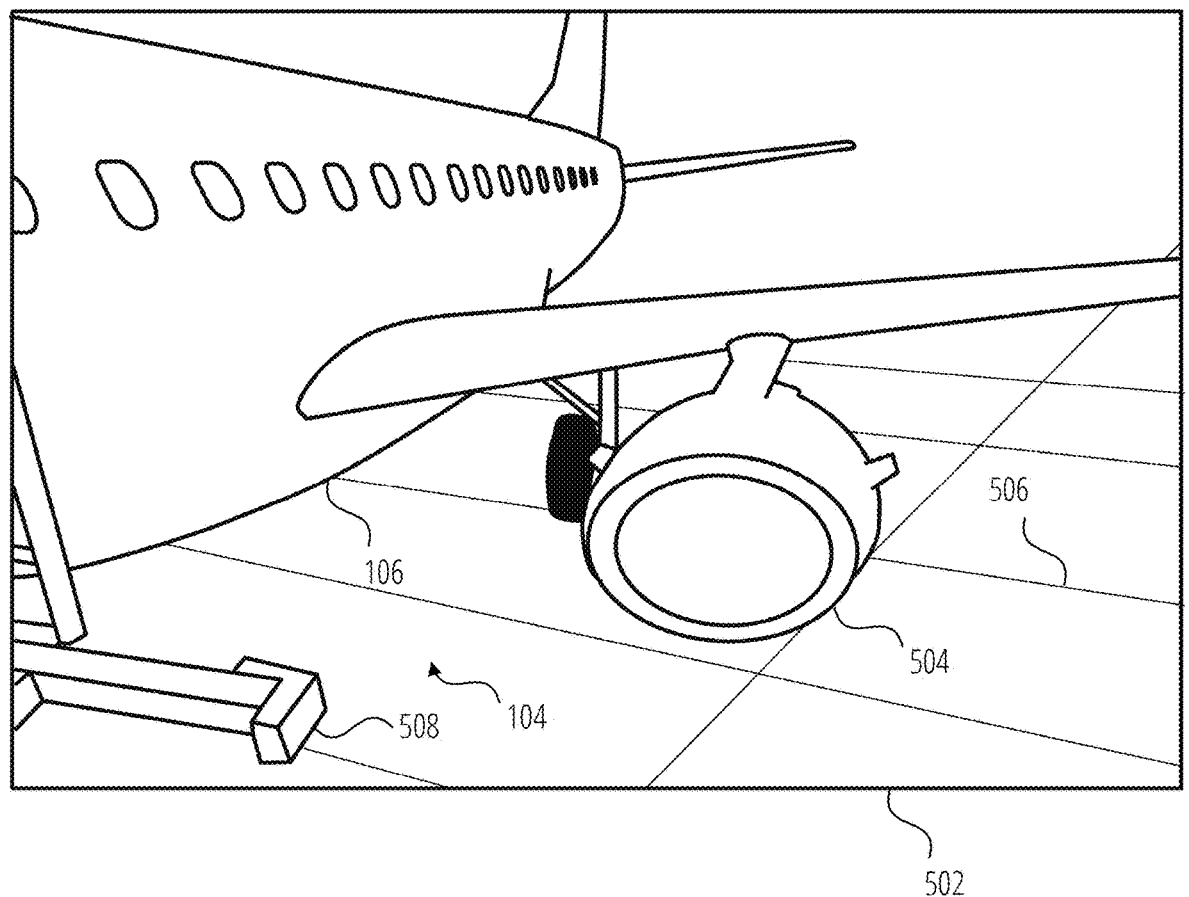
FIG. 5 is a non-limiting example embodiment of an image captured from the exterior bridge camera view 206 according to various aspects of the present disclosure.

FIG. 5 is a non-limiting example embodiment of an image captured from the exterior bridge camera view 206 according to various aspects of the present disclosure. In the exterior bridge image 502, the aircraft 106 is visible, including a component of the aircraft 106 such as an engine 504 which is positioned on the aircraft 106 such that it is the most extended portion of the wing and most likely to make contact with portions of the passenger boarding bridge 110. Also visible in the exterior bridge image 502 is an exterior bridge structure 508, such as a corner of a platform of an access structure, or other exterior structure of the passenger boarding bridge 110. Some other characteristics of the aircraft operating area 104, including ground markings 506, can also be seen in the exterior bridge image 502.

Returning to FIG. 2, a fourth example of a viewpoint is a distal bogie camera view 208 that may be provided by a camera mounted near the distal end of the passenger boarding bridge 110 and aimed toward the bogie 112. A fifth example of a viewpoint is a proximal bogie camera view 210 that may be provided by a camera mounted near the proximal end of the passenger boarding bridge 110 and aimed toward the bogie 112. The distal bogie camera view 208 and/or the proximal bogie camera view 210 can be used to determine statuses of the bogie 112 including, but not limited to, a wheel position and an amount of extension (from which a bridge height may be determined). The distal bogie camera view 208 and/or the proximal bogie camera view 210 can also be used to avoid collisions between the bogie 112 and objects within the aircraft operating area 104.

A fifth example of a viewpoint is an exterior gate camera view. Instead of being illustrated by an arrow, an exterior gate camera view is represented by the viewpoint illustrated in FIG. 2, that of a camera mounted on the terminal building to which the passenger boarding bridge 110 is connected. The exterior gate camera view may be provided in various locations, including but not limited to the illustrated location on the side of the passenger boarding bridge 110 closest to the aircraft 106 (in order to visualize the area between the passenger boarding bridge 110 and the aircraft 106), and a location on the side of the passenger boarding bridge 110 farthest from the aircraft 106 (in order to visualize the remaining area around the passenger boarding bridge 110 through which the passenger boarding bridge 110 transits during a docking process).

Figure 6:
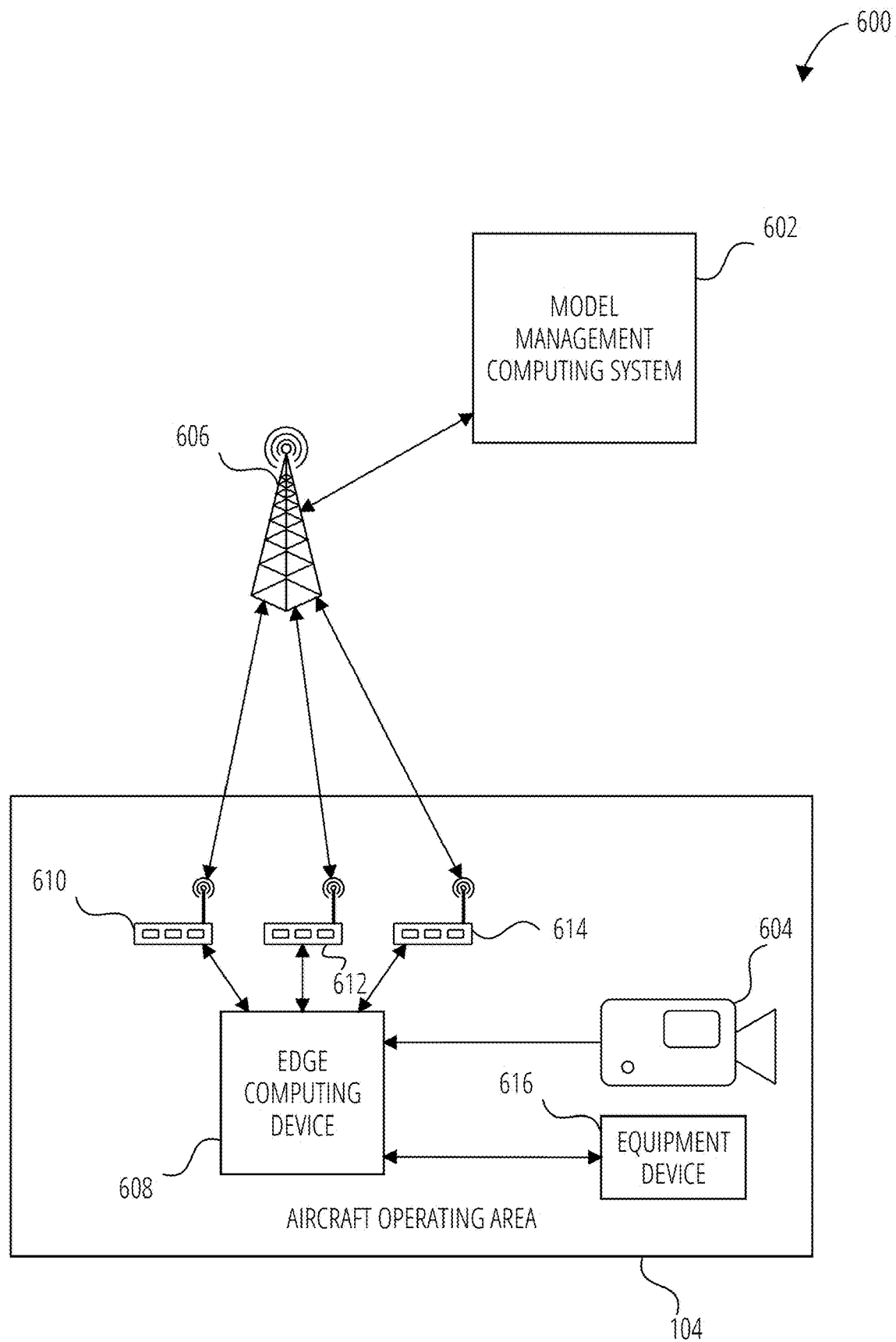
FIG. 6 is a schematic illustration of a non-limiting example embodiment of an autonomous control computing system for providing autonomous control services for one or more aircraft operating areas according to various aspects of the present disclosure.

FIG. 6 is a schematic illustration of a non-limiting example embodiment of an autonomous control computing system for providing autonomous control services for one or more aircraft operating areas according to various aspects of the present disclosure.

As shown, the autonomous control computing system 600 is deployed with respect to an aircraft operating area 104. In some embodiments, the aircraft operating area 104 may be an aircraft boarding gate area as illustrated above, where an aircraft is parked in order to be serviced and to board/deboard passengers, crew, and/or cargo. In some embodiments, the aircraft operating area 104 may be an area where an aircraft is parked for other types of service, such as a de-icing area. However, these embodiments should not be seen as limiting. In other embodiments, the aircraft operating area 104 may be an area for another type of operations, including but not limited to other areas of air and/or space ports, space stations, marine ports, rail terminals and switching yards, transit stations, distribution facilities, manufacturing facilities, warehouses, parking garages, hospitals, schools, hotels, prisons, construction sites, amusement parks, stadiums, event venues, casinos, ski facilities, and other industrial and non-industrial environments.

Within the aircraft operating area 104 (or near the aircraft operating area 104), one or more cameras 604 are placed to view at least a portion of the aircraft operating area 104, as illustrated and described above. In some embodiments, the one or more cameras 604 may include one or more internet protocol (IP) based camera having a range of capabilities. In some embodiments, the camera 604 may include a visible light sensor, an infrared sensor and LED for low-light or no-light image capture, a microphone, and/or other sensors.

In some embodiments, the camera 604 may include local storage for storing images and/or video before transmission to an edge computing device 608. Non-limiting examples of devices suitable for use as a camera 604 include models manufactured by ACTi Corporation of Taipei, Taiwan, including camera models Nos. B89 and I42.

Figure 11:
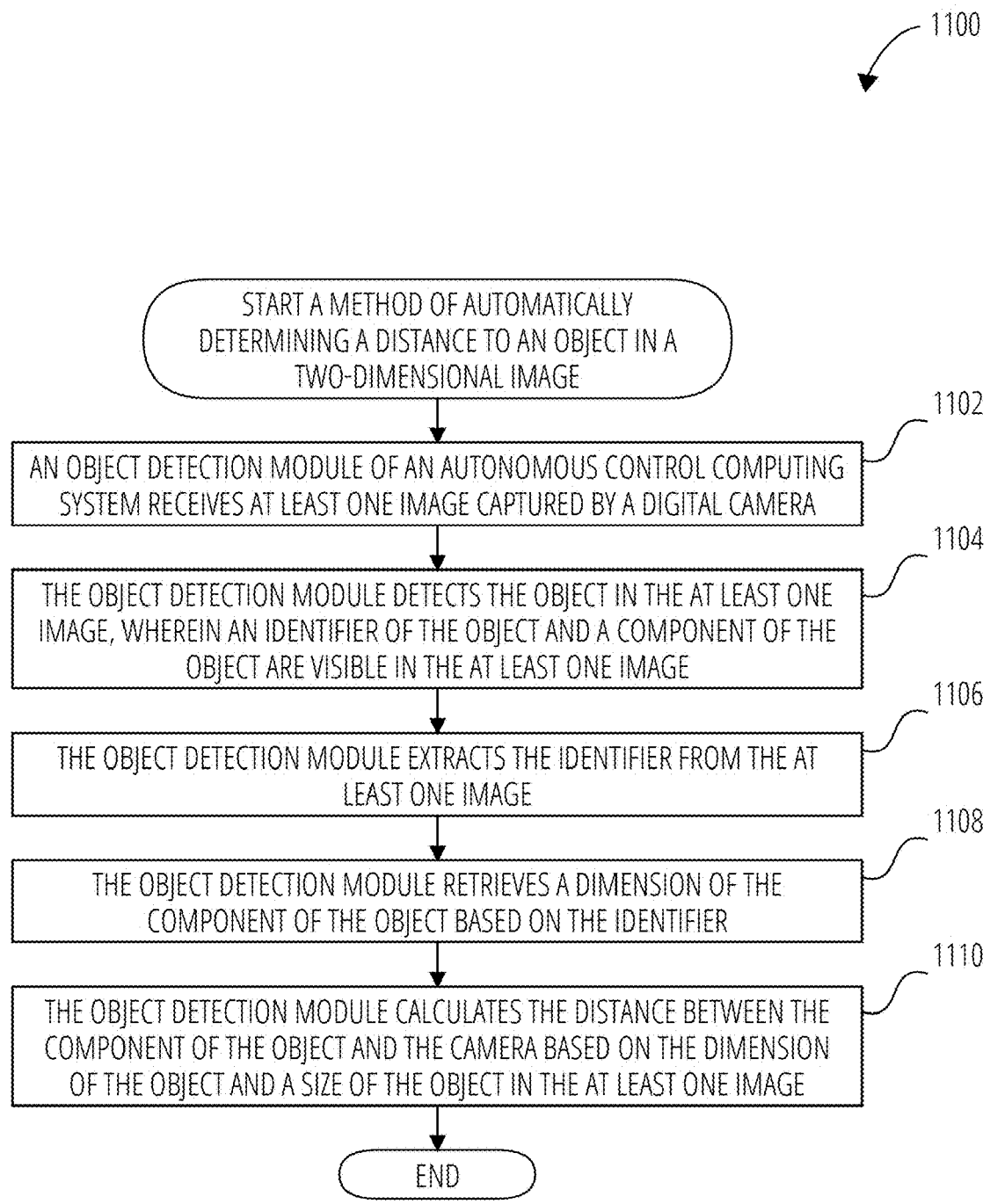
FIG. 11 is a flowchart that illustrates a non-limiting example embodiment of a method of automatically determining a distance to an object in a two-dimensional image according to various aspects of the present disclosure.

In some embodiments, the camera 604 may include a depth sensor for determining distances between the camera 604 and objects depicted in the image. However, in other embodiments, the camera 604 may not include depth sensing capabilities, and depth information may be calculated from two-dimensional images using a technique as illustrated in FIG. 11 and described in further detail below.

In some embodiments, the cameras 604 are configured to communicate images and/or video to an edge computing device 608 via IP over a wireless communication technology (including but not limited to Wi-Fi, WiMAX, 2G, 3G, 4G, or LTE), a wired communication technology (including but not limited to Ethernet); via a communication protocol other than IP (including but not limited to USB, Bluetooth, HDMI, DVI, VGA); or via any other suitable technique. Typically, the cameras 604 communicate with the edge computing device 608 over a high-throughput connection such as a local-area network (LAN). In some embodiments, the cameras 604 may transmit images (including but not limited to a stream of MJPEG frames or RAW frames), streaming video (including but not limited to a MPEG-4 stream, an HEVC/H.265 stream, or an H.264 stream), or any other image and/or video data to the edge computing device 608.

In some embodiments, the edge computing device 608 also communicates with one or more equipment devices 616, including but not limited to components of the passenger boarding bridge 110 and/or other equipment devices 616 such as mobile objects to be autonomously controlled by the autonomous control computing system. Data streams received from the one or more equipment devices 616 may include telemetry, user input, or other information related to or collected by the one or more equipment devices 616. Telemetry may include information regarding states of the equipment devices 616, data sensed by the equipment devices 616, control input provided to the equipment devices 616, or any other type of information. Data streams transmitted to the one or more equipment device 616 may include commands for autonomous operation, including but not limited to commands to actuators that cause movement of the passenger boarding bridge 110 and/or components thereof.

The equipment devices 616 may communicate with the edge computing device 608 using any wired or wireless technology, including but not limited to BACnet, Modbus, ADS, Ethernet, IP, Wi-Fi, mesh networking, and physical I/O. The receipt of this information from equipment devices 616 may allow the edge computing device 608 to incorporate overlays into video streams representing the telemetry (or other) information, automatically tag images and/or video based on the telemetry (or other) information, allow the model management computing system 602 to generate such overlays or automatic tags, and/or to improve the autonomous navigation commands transmitted to the equipment devices 616.

In some embodiments, the edge computing device 608 may be a laptop computing device, a desktop computing device, a tablet computing device, a smartphone computing device, or any other suitable type of computing device that may be present at or near the aircraft operating area 104. Typically, an edge computing device 608 may be installed or present at a location in the aircraft operating area 104. For example, if the aircraft operating area 104 is an aircraft boarding gate area, the edge computing device 608 may be installed near or integrated within a control panel of a passenger boarding bridge of the aircraft boarding gate area. As another example, if the aircraft operating area 104 is a de-icing area remote from an aircraft boarding gate area, the edge computing device 608 may be installed on a de-icing truck. As still another example, the edge computing device 608 may be installed in a central control room in an airport, and may connect to cameras 604 and equipment devices 616 at multiple aircraft operating areas 104 within the airport.

In some embodiments, the edge computing device 608 communicates with a model management computing system 602. The model management computing system 602 may include one or more computing devices configured to provide the components of the model management computing system 602 as described further below. Any suitable types of computing devices may be used to provide the model management computing system 602, including but not limited to server computing devices, desktop computing devices, laptop computing devices, tablet computing devices, and computing devices of a cloud computing system.

In some embodiments, the edge computing device 608 may be situated in a geographically remote location without wired network access to the Internet. Geographic reach may be especially important in various aircraft operating areas 104 related to airports, as the large distances involved may complicate the use of simpler, higher bandwidth technologies such as Wi-Fi or wired ethernet. As shown, the edge computing device 608 may communicate with the model management computing system 602 wirelessly via a cell site 606 to take advantage of the larger geographic reach of cellular data networks.

Though cellular data networks do offer a large geographic reach, providers of cell sites 606 often throttle bandwidth once a relatively low monthly data cap is reached. That is, a connection to a cell site 606 may use 4G technology that is theoretically capable of upload speeds of 8 Mbps to 50 Mbps, but the provider of the cell site 606 may throttle the bandwidth to 2G upload speeds of 128 Kbps after a data cap is reached.

In order to overcome the limitations of the low bandwidth provided by cell sites 606, the autonomous control computing system 600 may use a plurality of modems to increase the overall bandwidth available for communication with the model management computing system 602. In the illustrated embodiment, the edge computing device 608 uses a first modem 610, a second modem 612, and a third modem 614 to communicate with the model management computing system 602, though in other embodiments more or fewer modems may be used. The cost of many separate connections to the cell site 606 that are subject to data caps and bandwidth throttling is typically much lower than the cost of a single connection to the cell site 606 at uncapped high bandwidth, and so is preferable despite the complication of dealing with throttled bandwidth. In some embodiments, the edge computing device 608 may process data streams from the cameras 604 and the equipment devices 616 to fit within the reduced bandwidth available from the plurality of modems, and may generate combined data streams for transmission using these low-bandwidth connections. Techniques for generating combined data streams for transmission over low-bandwidth connections are described in commonly owned, co-pending U.S. application Ser. No. 17/458,076, filed Aug. 26, 2021, the entire disclosure of which is hereby incorporated by reference herein for all purposes.

That said, in some embodiments, other wireless or wired communication techniques (including but not limited to Wi-Fi, WiMAX, or satellite internet) may be used to communicate between the edge computing device 608 and the model management computing system 602. Further, in some embodiments, direct live communication between the edge computing device 608 and the model management computing system 602 may not be available. Instead, in such embodiments, the edge computing device 608 and model management computing system 602 may communicate periodically. For example, the edge computing device 608 may periodically be removed from an installed location to be synchronized with the model management computing system 602 via a wired connection. As another example, the edge computing device 608 and model management computing system 602 may exchange data via a removable computer-readable medium, including but not limited to a flash drive, floppy disk, hard drive, CD-ROM, or DVD-ROM.

Though a single edge computing device 608 and a single aircraft operating area 104 is illustrated for the sake of simplicity, this is a non-limiting example embodiment only. In some embodiments, a single model management computing system 602 may be associated with multiple aircraft operating areas 104. Further, in some embodiments, a single aircraft operating area 104 may be associated with more than one edge computing device 608 and/or more than one camera 604 and/or more than one equipment device 616.

Figure 7:
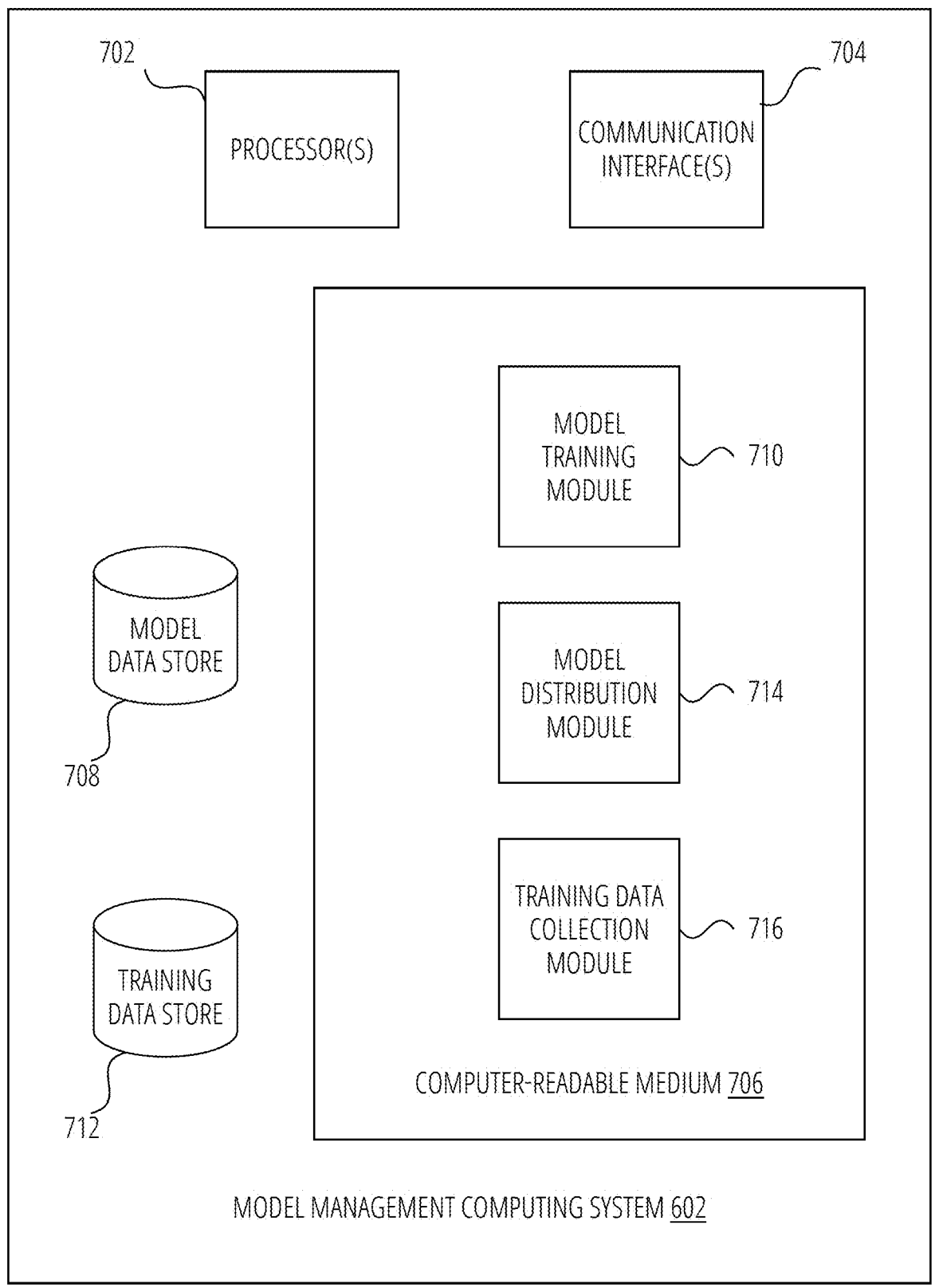
FIG. 7 is a block diagram that illustrates aspects of a non-limiting example embodiment of a model management computing system according to various aspects of the present disclosure.

FIG. 7 is a block diagram that illustrates aspects of a non-limiting example embodiment of a model management computing system according to various aspects of the present disclosure. In some embodiments, the model management computing system 602 is configured to collect images from cameras installed at aircraft operating areas 104 to use as training data, to train machine learning models to detect objects in the images, and to distribute the machine learning models to edge computing devices installed at or near aircraft operating area 104 for providing autonomous control.

The illustrated model management computing system 602 may be implemented by any computing device or collection of computing devices, including but not limited to a desktop computing device, a laptop computing device, a mobile computing device, a server computing device, a computing device of a cloud computing system, and/or combinations thereof. In some embodiments, the model management computing system 602 is configured to receive images from one or more edge computing devices 608, to generate training data based on the received images, and to train one or more machine learning models to identify objects in the images. In some embodiments, the model management computing system 602 is also configured to distribute trained machine learning models to edge computing devices 608 for use.

As shown, the model management computing system 602 includes one or more processors 702, one or more communication interfaces 704, a model data store 708, a training data store 712, and a computer-readable medium 706.

In some embodiments, the processors 702 may include any suitable type of general-purpose computer processor. In some embodiments, the processors 702 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 704 include one or more hardware and or software interfaces suitable for providing communication links between components. The communication interfaces 704 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof. For example, the communication interfaces 704 may include at least one interface suitable for receiving information from one or more edge computing devices 608 transmitted by the edge computing devices 608 via a low-bandwidth connection between the edge computing devices 608 and a cell site 606.

As shown, the computer-readable medium 706 has stored thereon logic that, in response to execution by the one or more processors 702, cause the model management computing system 602 to provide a model training module 710, a model distribution module 714, and a training data collection module 716.

As used herein, "computer-readable medium" refers to a removable or nonremovable device that implements any technology capable of storing information in a volatile or nonvolatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the model training module 710 is configured to train machine learning models using training data stored in the training data store 712. In some embodiments, the model training module 710 is also configured to store trained machine learning models in the model data store 708. In some embodiments, the training data collection module 716 is configured to receive images from edge computing devices 608 and to use the images to generate training data. In some embodiments, the training data collection module 716 stores the generated training data in the training data store 712. In some embodiments, the model distribution module 714 is configured to transmit trained machine learning models from the model data store 708 to edge computing devices 608.

The model training module 710 may train any type of machine learning model for recognizing objects in images, including but not limited to convolutional neural networks, and may use any suitable technique for training the machine learning models, including but not limited to an Adam optimizer and/or gradient descent. The training data collection module 716 may be configured to generate a user interface through which labels may be applied to images used for training data, and/or for updating labels applied to images by an untrained or un-updated machine learning model.

In some embodiments, the model training module 710 may train the machine learning model to detect specific types of objects, such as an aircraft 106, and/or components of an object, such as an engine 504. In some embodiments, the model training module 710 may train the machine learning model to extract semantic information from images. For example, the machine learning model may be trained to tag and interpret identifiers within an image, including but not limited to a tail number of an aircraft 106, a license plate of a ground service vehicle 108, and a bar code (e.g., a one-dimensional bar code, a QR code, or any other encoded identifier).

In some embodiments, the model training module 710 may train the machine learning model to distinguish background and/or foreground objects (intruder objects) from self objects that are a part of autonomously controlled equipment. For example, training images collected from a top-down access structure view 202 may be annotated to indicate pixels associated with an access structure (e.g., a stairway 306, a bag slide 304, a wheelchair lift), and the access structure may be indicated as a self object associated with the passenger boarding bridge 110. In some embodiments, a pixel mask may be used to identify the self object within images instead of a machine learning model, but benefits may be provided by using a machine learning model. For example, even if a camera is installed in a static position with respect to a self object, using a machine learning model allows for some movement in the installation of the camera, such as if the camera or mounting structure is jostled during use, if the mounting structure flexes during use, and so on. As another example, using a machine learning model allows the camera to be installed in a position that is not static with respect to the self object. That is, a self object coupled to the passenger boarding bridge 110 may be identified by a camera installed with an exterior gate camera view, such that the self object moves within the view of the camera during operation of the passenger boarding bridge 110.

In some embodiments, training data may be collected and machine learning models may be stored for each aircraft operating area 104 in which an edge computing device 608 is installed. This may provide benefits in that distinctive characteristics of a particular aircraft operating area 104, including but not limited to specific camera installation locations, site-specific ground markings 506, site-specific weather conditions, and/or other factors may be learned and taken into account in the machine learning models. In some embodiments, a first machine learning model trained in a first aircraft operating area 104 may be used as a starting point when training a second machine learning model to be used in a second aircraft operating area 104, so that training for objects common to the aircraft operating areas 104 (e.g., aircraft 106, standard ground service vehicles 108, etc.) is more efficient.

The model management computing system 602 is primarily described herein as being used to collect images from videos from edge computing devices 608 in order to train and distribute machine learning models usable by the edge computing devices 608. However, because the model management computing system 602 receives data streams from the edge computing devices 608, the model management computing system 602 may use the data streams for many other purposes. For example, in some embodiments the model management computing system 602 (or another system that receives collected data streams from the model management computing system 602) may provide centralized monitoring and management of the monitored aircraft operating areas 104. The model management computing system 602 can thus provide on-demand streams of video, images, telemetry, or video/images with telemetry superimposed thereon to client computing devices such as mobile computing devices, desktop computing devices, and so on. Telemetry overlays may include telemetry information provided by the edge computing devices 608 directly from the equipment devices 616, and/or may include conditions detected by the edge computing devices 608 using the machine learning models described herein.

As used herein, "module" refers to logic embodied in hardware or software instructions, which can be written in one or more programming languages, including but not limited to C, C++, C#, COBOL, JAVA™, PHP, Perl, HTML, CSS, Javascript, VBScript, ASPX, Go, and Python. A module may be compiled into executable programs or written in interpreted programming languages. Software modules may be callable from other modules or from themselves. Generally, the modules described herein refer to logical modules that can be merged with other modules, or can be divided into sub-modules. The modules can be implemented by logic stored in any type of computer-readable medium or computer storage device and be stored on and executed by one or more general purpose computers, thus creating a special purpose computer configured to provide the module or the functionality thereof. The modules can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. For example, in some embodiments, a cloud service such as Google Cloud Storage may be used as a data store. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 8:
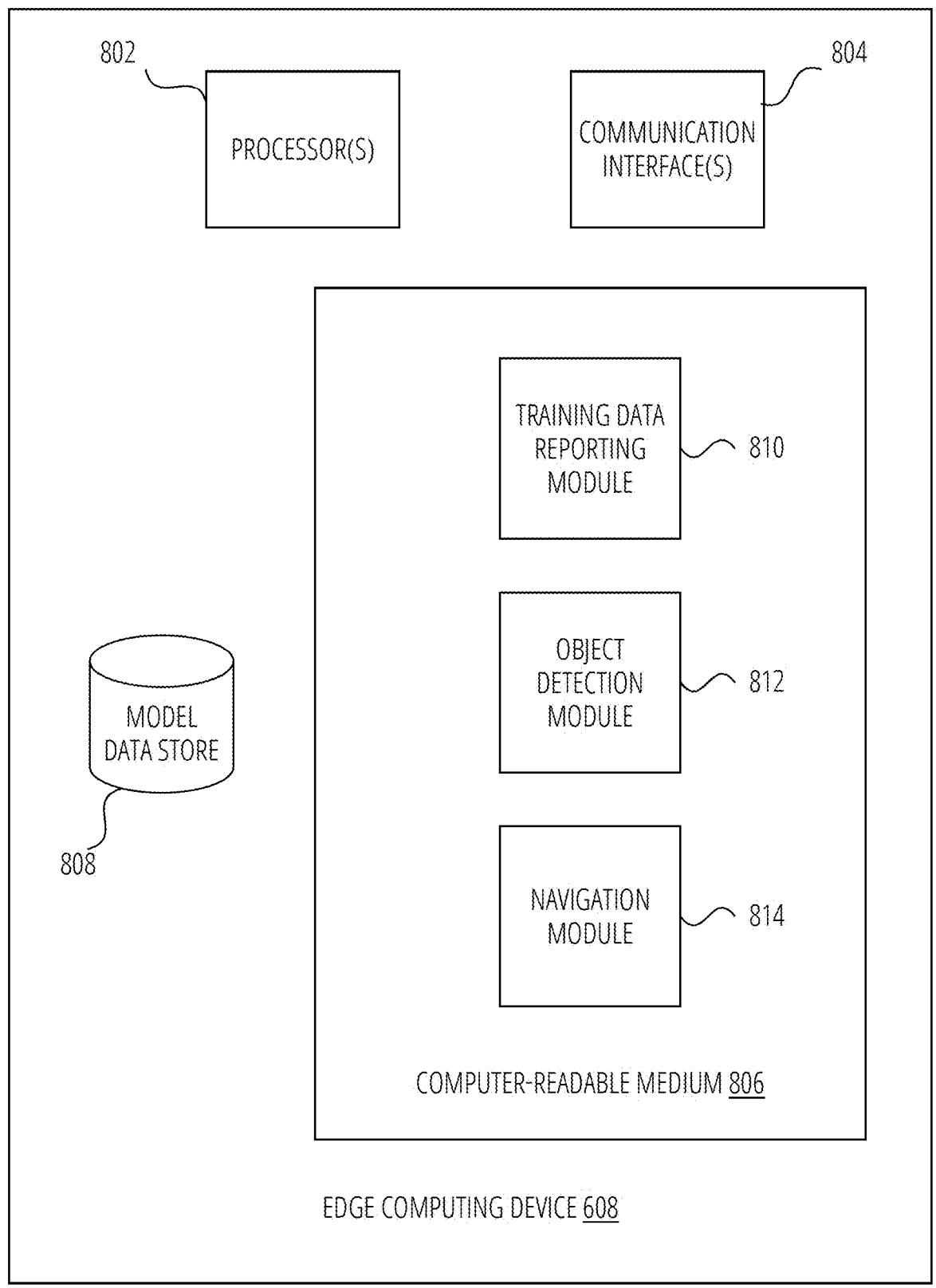
FIG. 8 is a block diagram that illustrates aspects of a non-limiting example embodiment of an edge computing device according to various aspects of the present disclosure.

FIG. 8 is a block diagram that illustrates aspects of a non-limiting example embodiment of an edge computing device according to various aspects of the present disclosure. The illustrated edge computing device 608 may be implemented by any computing device or collection of computing devices, including but not limited to a desktop computing device, a laptop computing device, a mobile computing device, a server computing device, a computing device of a cloud computing system, and/or combinations thereof. The edge computing device 608 is configured to receive images from one or more cameras 604, to transmit the images to a model management computing system 602 for generation of training data, to receive trained machine learning models from the model management computing system 602, to use the trained machine learning models to detect apparatuses within the aircraft operating area 104, and to control one or more devices based on the detected apparatuses.

As shown, the edge computing device 608 includes one or more processors 802, one or more communication interfaces 804, a model data store 808, and a computer-readable medium 806.

In some embodiments, the processors 802 may include any suitable type of general-purpose computer processor. In some embodiments, the processors 802 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 804 include one or more hardware and or software interfaces suitable for providing communication links between components. The communication interfaces 804 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof. Typically, the communication interfaces 804 include at least one low-bandwidth, long-distance wireless communication interface, such as a 2G, 3G, 4G, 5G, or LTE interface, for communication with the model management computing system 602.

As shown, the computer-readable medium 806 has stored thereon logic that, in response to execution by the one or more processors 802, cause the edge computing device 608 to provide a training data reporting module 810, an object detection module 812, and a navigation module 814. In some embodiments, the training data reporting module 810 is configured to transmit images from one or more cameras 604 to the model management computing system 602 for the creation of training data. In some embodiments, the object detection module 812 is configured to receive trained machine learning models, store the models and retrieve the models using the model data store 808, and to execute the models on new images received from the one or more cameras 604. In some embodiments, the navigation module 814 is configured to autonomously operate one or more pieces of equipment, including but not limited to a passenger boarding bridge 110, within the aircraft operating area 104. Further description of the configuration of each of these components is provided below.

Though the model management computing system 602 and the edge computing device 608 are illustrated as separate systems/devices, in some embodiments the functionality described for these separate systems may be provided by a single system. Likewise, in some embodiments the functionality for one of these systems may be provided by the other system, and vice versa. In some embodiments, the functionality of these systems/devices may be collectively provided by multiple devices instead of a single device.

Figure 9:
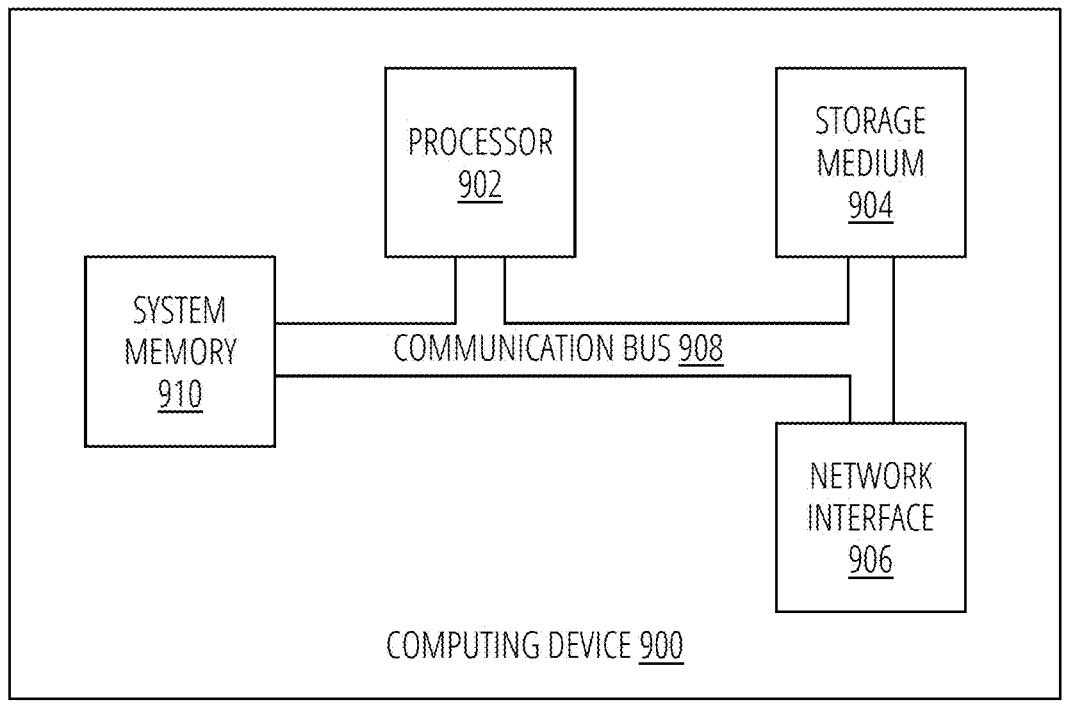
FIG. 9 is a block diagram that illustrates a non-limiting example embodiment of a computing device appropriate for use as a computing device with embodiments of the present disclosure.

FIG. 9 is a block diagram that illustrates aspects of an exemplary computing device 900 appropriate for use as a computing device of the present disclosure. While multiple different types of computing devices were discussed above, the exemplary computing device 900 describes various elements that are common to many different types of computing devices. While FIG. 9 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 900 may be any one of any number of currently available or yet to be developed devices.

In its most basic configuration, the computing device 900 includes at least one processor 902 and a system memory 910 connected by a communication bus 908. Depending on the exact configuration and type of device, the system memory 910 may be volatile or nonvolatile memory, such as read only memory ("ROM"), random access memory ("RAM"), EEPROM, flash memory, or similar memory technology. Those of ordinary skill in the art and others will recognize that system memory 910 typically stores data and/or program modules that are immediately accessible to and/or currently being operated on by the processor 902. In this regard, the processor 902 may serve as a computational center of the computing device 900 by supporting the execution of instructions.

As further illustrated in FIG. 9, the computing device 900 may include a network interface 906 comprising one or more components for communicating with other devices over a network. Embodiments of the present disclosure may access basic services that utilize the network interface 906 to perform communications using common network protocols. The network interface 906 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 906 illustrated in FIG. 9 may represent one or more wireless interfaces or physical communication interfaces described and illustrated above with respect to particular components of the computing device 900.

In the exemplary embodiment depicted in FIG. 9, the computing device 900 also includes a storage medium 904. However, services may be accessed using a computing device that does not include means for persisting data to a local storage medium. Therefore, the storage medium 904 depicted in FIG. 9 is represented with a dashed line to indicate that the storage medium 904 is optional. In any event, the storage medium 904 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 902, system memory 910, communication bus 908, storage medium 904, and network interface 906 are known and commercially available. For case of illustration and because it is not important for an understanding of the claimed subject matter, FIG. 9 does not show some of the typical components of many computing devices. In this regard, the computing device 900 may include input devices, such as a keyboard, keypad, mouse, microphone, touch input device, touch screen, tablet, and/or the like. Such input devices may be coupled to the computing device 900 by wired or wireless connections including RF, infrared, serial, parallel, Bluetooth, Bluetooth low energy, USB, or other suitable connections protocols using wireless or physical connections. Similarly, the computing device 900 may also include output devices such as a display, speakers, printer, etc. Since these devices are well known in the art, they are not illustrated or described further herein.

Figure 10:
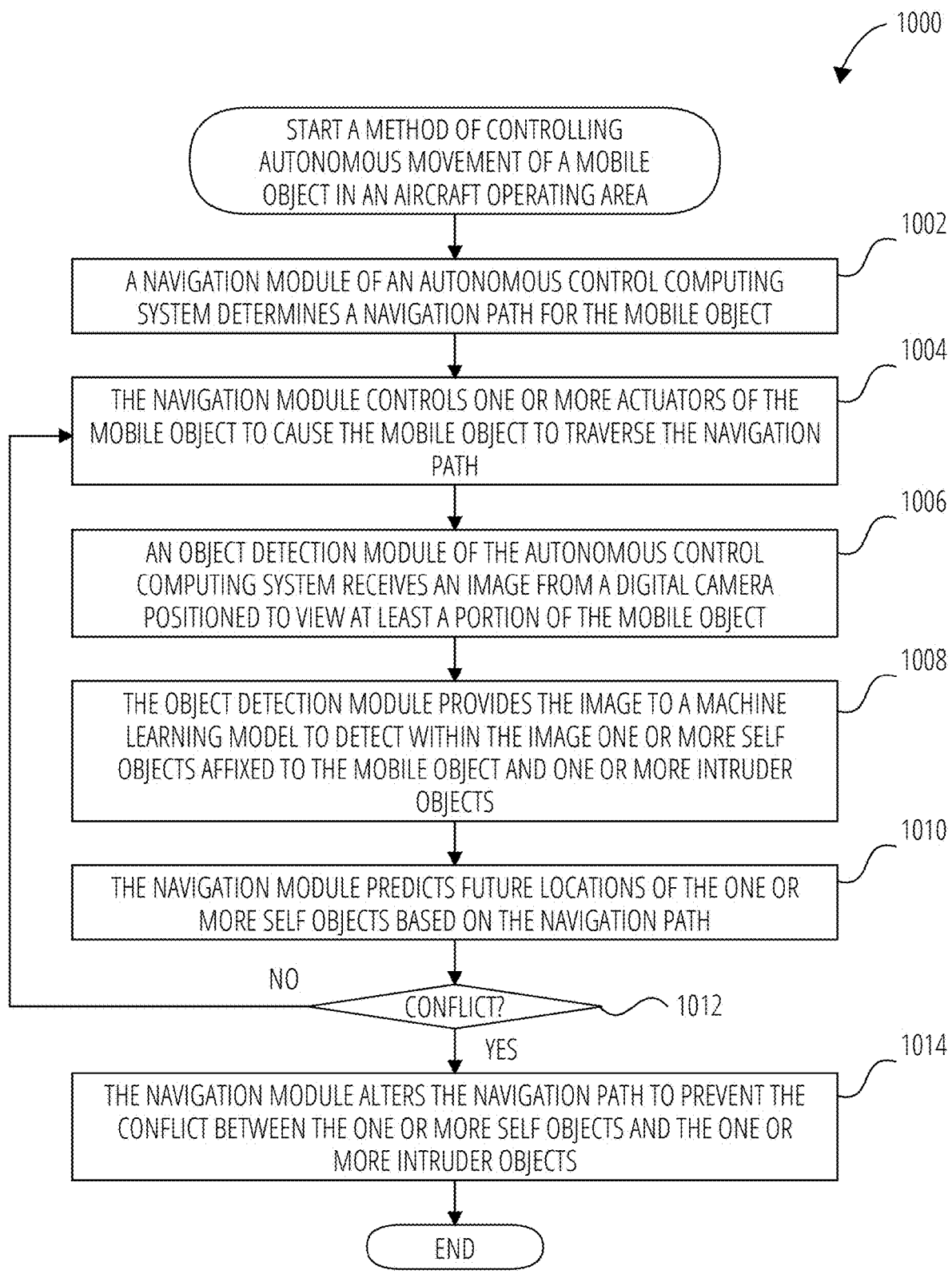
FIG. 10 is a flowchart that illustrates a non-limiting example embodiment of a method of controlling autonomous movement of a mobile object in an aircraft operating area according to various aspects of the present disclosure.

FIG. 10 is a flowchart that illustrates a non-limiting example embodiment of a method of controlling autonomous movement of a mobile object in an aircraft operating area according to various aspects of the present disclosure. In the method 1000, collisions between a mobile object (e.g., a passenger boarding bridge 110 or other autonomously piloted object in an aircraft operating area 104) and an intruder object (e.g., aircraft 106, ground crew, ground service vehicles 108, or other objects within the aircraft operating area 104) are avoided through the use of machine vision analysis of images from two-dimensional digital cameras. Though embodiments involving an autonomously operated passenger boarding bridge 110 are primarily described below, these embodiments should not be seen as limiting. In other embodiments, other mobile objects, including but not limited to ground service vehicles 108, may be controlled.

From a start block, the method 1000 proceeds to block 1002, where a navigation module 814 of an autonomous control computing system 600 determines a navigation path for the mobile object. In some embodiments, the navigation path may cause the mobile object to traverse directly from a current position (e.g., a parked position of a passenger boarding bridge 110) to a desired position (e.g., a deployed position of the passenger boarding bridge 110). In some embodiments, the desired position may be determined based on a task assigned to the mobile object by a dispatch system. For example, the dispatch system may indicate that a particular model of aircraft 106 is taxiing to the aircraft operating area 104 or has arrived at the aircraft operating area 104, and the desired position may be determined to place the passenger boarding bridge 110 in an appropriate position for docking with the model of aircraft 106. In some embodiments, the desired position may be determined automatically, including but not limited to by the navigation module 814 automatically determining a model of an aircraft 106 based on an image from a camera 604, automatically detecting a location of an aircraft door 408 based on an image from a camera 604, or using any other suitable technique.

At block 1004, the navigation module 814 controls one or more actuators of the mobile object to cause the mobile object to traverse the navigation path. In some embodiments, the navigation module 814 transmits commands to steering actuators, drive actuators, and other devices in order to move the mobile object along the navigation path, and may use shaft encoders, fiducial markers, and/or other position determining techniques in order to track a current location of the mobile object along the navigation path.

At block 1006, an object detection module 812 of the autonomous control computing system 600 receives an image from a digital camera 604 positioned to view at least a portion of the mobile object, and at block 1008, the object detection module 812 provides the image to a machine learning model to detect within the image one or more self objects affixed to the mobile object and one or more intruder objects. Any portion of the mobile object or object attached to the mobile object that is visible in the image may be considered a self object. Some non-limiting examples of self objects include the bogie 112 illustrated in FIG. 2, the stairway 306 illustrated in FIG. 3, the bag slide 304 illustrated in FIG. 3, and the exterior bridge structure 508 illustrated in FIG. 5. The intruder objects may be any object within the aircraft operating area 104 that is not a self object. Some non-limiting example of intruder objects include ground crew, ground service vehicles 108, and portions of the aircraft 106.

At block 1010, the navigation module 814 predicts future locations of the one or more self objects based on the navigation path. In some embodiments, the navigation module 814 may use the navigation path, a known geometry of the mounting location of the camera 604 from which the image was received, and the detected location of the self object to determine future locations within the image at which the self object is expected to be.

The method 1000 then proceeds to decision block 1012, where a determination is made regarding whether there is a conflict between the future locations of the one or more self objects and the one or more intruder objects. In some embodiments, the object detection module 812 may determine whether the determined future locations within the image at which the self object is expected to be include an intruder object. In other words, the object detection module 812 determines whether the intruder object is within a portion of the image that the self object is expected to transit through (e.g., a ground service vehicle 108 is within the expected path of the stairway 306). In some embodiments, the object detection module 812 may determine whether a conflict already exists. For example, an intruder object such as a ground crew member may be detected climbing on the stairway 306.

In some embodiments, the object detection module 812 may determine that a conflict exists regardless of the type of intruder object. In some embodiments, the object detection module 812 may determine whether a conflict exists based on a type and/or a behavior of the intruder object. For example, if the object detection module 812 detects a ground crew member on the stairway 306, it may not determine a conflict exists because the ground crew member could hold on to the stairway 306, versus finding a jacket, a bag, or another item on the stairway 306 that could fall off and become damaged or interfere with other equipment. As another example, the object detection module 812 may predict future locations for the intruder object, and if the future locations do not coincide with the future locations of the one or more self objects, the object detection module 812 may not determine that there is a conflict.

If it is determined that a conflict exists, then the result of decision block 1012 is YES, and the method 1000 proceeds to block 1014, where the navigation module 814 alters the navigation path to prevent the conflict between the one or more self objects and the one or more intruder objects. In some embodiments, the navigation module 814 may halt motion of the mobile object to allow the conflict to be cleared. In some embodiments, the navigation module 814 may plan a new navigation path for which the predicted future of locations of the self objects do not have conflicts.

The method 1000 may then proceed to an end block and terminate, or may return to block 1004 to continue autonomous control of the mobile object.

Returning to decision block 1012, if it is determined that no conflict exists, then the result of decision block 1012 is NO, and the method 1000 returns to block 1004 to continue autonomous control of the mobile object. Alternatively, the method 1000 may proceed to the end block and terminate.

Though the description above primarily describes the detection of self objects and intruder objects using a single image, this description should not be seen as limiting. In some embodiments, multiple images from different cameras 604 may be used to detect or confirm detection and/or locations of self objects and intruder objects. In some embodiments, the object detection module 812 may use knowledge of the fields of view of multiple the cameras 604 to further review detection of objects that are visible in images from more than one camera 604.

Further, although embodiments discussed above primarily relate to the use of two-dimensional images, in some embodiments three-dimensional images or images that include depth information, including but not limited to images generated using LIDAR, may be used instead of or in addition to two-dimensional images.

FIG. 11 is a flowchart that illustrates a non-limiting example embodiment of a method of automatically determining a distance to an object in a two-dimensional image according to various aspects of the present disclosure. While technologies such as depth sensors are available to determine distances between pixels in an image and a camera 604 capturing the image, using the method 1100 has various advantages. For example, the method 1100 may be effective in a variety of weather conditions (e.g., heavy rain, hail, dense fog) in which a depth sensor may be ineffective. As another example, depth sensors may have difficulty sensing the materials of some objects (e.g., highly reflective, curved materials) that are readily visible using a visible light camera 604.

From a start block, the method 1100 proceeds to block 1102, where an object detection module 812 of an autonomous control computing system 600 receives at least one image captured by a digital camera 604, and at block 1104, the object detection module 812 detects the object in the at least one image. An identifier of the object and a component of the object are visible in the at least one image. In some embodiments, the object may be an aircraft 106, a ground service vehicle 108, or any other object to be measured. The component of the object may be any part of the object to which a distance is to be measured. In some embodiments, the component may be a part of the object with which a collision might be likely due to a protrusion or other aspect of the arrangement, such as a pylon-mounted engine 504. In some embodiments, the identifier of the object may be a tail number of an aircraft 106. In some embodiments, more than one image may be used to visualize the component of the object and the identifier. For example, an bridge exterior bridge camera view may visualize an engine 504 (the component) of an aircraft 106 (the object), while an exterior gate camera view may visualize a tail number (the identifier).

At block 1106, the object detection module 812 extracts the identifier from the at least one image. In some embodiments, a machine learning model may be used to find the identifier in the at least one image, and another technique or another machine learning model, including but not limited to optical character recognition, may be used to extract the meaning of the identifier (e.g., the alphanumeric value of the tail number). In some embodiments, a single machine learning model may find the identifier and extract the semantic value of the identifier from the at least one image.

At block 1108, the object detection module 812 retrieves a dimension of the component of the object based on the identifier. In some embodiments, the autonomous control computing system 600 may include an object data store that correlates identifiers with models of objects, and that includes dimension information of the models. For example, the object data store may correlate tail numbers with models of associated aircraft 106. Once the object detection module 812 has retrieved the model of the aircraft 106, the object detection module 812 can then retrieve a width, height, depth, or other dimension of a component including but not limited to an engine 504 that is associated with that model of aircraft 106.

At block 1110, the object detection module 812 calculates the distance between the component of the object and the camera based on the dimension of the object and a size of the object in the at least one image. In some embodiments, the object detection module 812 may use edge detection or another technique to establish an exact number of pixels taken up by the component of the object (e.g., an exact number of pixels wide the engine 504 appears). The object detection module 812 may then use geometry to calculate, using the apparent size based on the number of pixels taken up by the component and the actual size based on the dimension retrieved from the object data store, the distance between the camera 604 and the component of the object.

The method 1100 then proceeds to an end block and terminates. The distance determined by the method 1100 may be used for any purpose, including but not limited to controlling autonomous motion of a mobile object to prevent the distance from decreasing below a threshold, to present alarms in the case of the distance decreasing below a threshold, or for any other purpose.

Though an embodiment in which distance to an engine 504 of an aircraft 106 is measured in an image such as exterior bridge image 502 is primarily described above, this embodiment should not be seen as limiting. For example, in some embodiments, a distance between an aircraft door 408 and a bridge floor 406 may be measured in an image such as interior bridge image 402, in order to provide camera-based functionality that is similar to a physical safety shoe previously used.

While illustrative embodiments have been illustrated and described, it will be appreciated that various changes can be made therein without departing from the spirit and scope of the invention.

The invention claimed is:

1. A computer-implemented method of controlling autonomous movement of a mobile object in an aircraft operating area, the method comprising:
   receiving, by an autonomous control computing system, an image from a digital camera positioned to view at least a portion of the mobile object;
   providing, by the autonomous control computing system, the image to a machine learning model to detect within the image one or more self objects and one or more intruder objects, wherein the one or more self objects are affixed to the mobile object;
   predicting, by the autonomous control computing system, future locations for the one or more self objects based on a navigation path for the mobile object; and
   in response to detecting an overlap between the future locations for the self objects and the intruder objects, altering, by the autonomous control computing system, the navigation path to prevent a collision between the self objects and the intruder objects.

2. The computer-implemented method of claim 1, wherein the mobile object is a passenger boarding bridge.

3. The computer-implemented method of claim 2, wherein the one or more self objects include at least one of a stairway, a bogie, a conveyor, a bag slide, and a wheelchair lift.

4. The computer-implemented method of claim 1, wherein the one or more intruder objects include at least one of a human, a ground-service vehicle, and an aircraft.

5. The computer-implemented method of claim 1, wherein altering the navigation path includes halting further movement of the mobile object until the one or more intruder objects do not overlap with the future locations of the one or more self objects.

6. The computer-implemented method of claim 1, wherein altering the navigation path includes determining an updated navigation path for the mobile object for which predicted future locations of the one or more self objects do not overlap with the one or more intruder objects.

7. The computer-implemented method of claim 1, wherein altering the navigation path includes:
   determining a type of the one or more intruder objects; and
   altering the navigation path based on the type of the one or more intruder objects.

8. The computer-implemented method of claim 1, wherein altering the navigation path includes:
   determining a status of one or more objects; and
   altering the path based on the status of the one or more objects.

9. The computer-implemented method of claim 8, wherein the status of one or more objects includes at least one of whether an aircraft is present in the aircraft operating area, whether a chock is in a deployed position, and whether a service connection to the aircraft has been established.

10. A non-transitory computer-readable medium having computer-executable instructions stored thereon that, in response to execution by one or more processors of a computing system, cause the computing system to perform a method as recited in claim 1.

11. A system, comprising:
    a passenger boarding bridge in an aircraft operating area;
    at least one camera positioned to capture images of the aircraft operating area; and
    an autonomous control computing system communicatively coupled to the at least one camera and configured to perform a method as recited in claim 1.

12. The system of claim 11, wherein the passenger boarding bridge includes an exterior access structure comprising at least one of a stairway, a bag slide, and a wheelchair lift; and wherein the at least one camera includes at least one camera mounted to have a top-down view of the exterior access structure.

13. The system of claim 11, wherein the passenger boarding bridge includes a bogie, and wherein the at least one camera includes at least one camera mounted to an underside of the passenger boarding bridge to have a view of the bogie.

14. The system of claim 11, wherein the at least one camera includes at least one camera mounted to an interior of the passenger boarding bridge to have a view of an opening of the passenger boarding bridge and a walkway of the passenger boarding bridge.

15. The system of claim 11, wherein the at least one camera includes at least one camera mounted to a terminal building to which the passenger boarding bridge is affixed.

16. The system of claim 11, wherein the at least one camera includes at least one camera mounted to the passenger boarding bridge and aimed substantially horizontally to have a view of at least a portion of an aircraft when an aircraft is present in the aircraft operating area.

* * * * *